(12) United States Patent
Chien et al.

(10) Patent No.: US 11,604,402 B2
(45) Date of Patent: Mar. 14, 2023

(54) PROJECTION SYSTEM AND PROJECTION METHOD

(71) Applicant: Coretronic Corporation, Hsin-Chu (TW)

(72) Inventors: Chun-Lin Chien, Hsin-Chu (TW); Yu-Kuan Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/209,231

(22) Filed: Mar. 23, 2021

(65) Prior Publication Data

US 2021/0364904 A1 Nov. 25, 2021

(30) Foreign Application Priority Data

May 20, 2020 (CN) .......................... 202010428793.2

(51) Int. Cl.
G03B 21/26 (2006.01)
G03B 21/14 (2006.01)
G03B 21/56 (2006.01)

(52) U.S. Cl.
CPC ........... *G03B 21/26* (2013.01); *G03B 21/142* (2013.01); *G03B 21/567* (2013.01)

(58) Field of Classification Search
None
See application file for complete search history.

(56) References Cited

U.S. PATENT DOCUMENTS 10,386,712 B1  8/2019  Yett

FOREIGN PATENT DOCUMENTS

| CN | 1821861 | 8/2006 |
| CN | 102081284 | 6/2011 |
| CN | 102318350 | 1/2012 |
| JP | 2011029727 A * | 2/2011 |
| JP | 2017009762 A * | 1/2017 |
| WO | 2017122500 | 7/2017 |

OTHER PUBLICATIONS

Office Action of Taiwan Counterpart Application, dated Apr. 13, 2021, pp. 1-14.

* cited by examiner

*Primary Examiner* — Bao-Luan Q Le
*Assistant Examiner* — Danell L Owens
(74) *Attorney, Agent, or Firm* — JCIPRNET (57) ABSTRACT

A projection system and a projection method are provided. The projection system includes a first projector and a second projector. The first projector is configured to project a first grid picture onto a projection surface. The second projector is configured to project a second grid picture onto the projection surface. The second grid picture and the first grid picture are blended into a blended projection picture. The first grid picture includes a first overlap region. Grid lines of the first overlap region are displayed in a first color. The second grid picture includes a second overlap region. Grid lines of the second overlap region are displayed in a second color. The first color and the second color are complementary colors. When the blended projection picture is formed, grid lines of an overlap region of the first grid picture and the second grid picture are displayed in a recognition color.

21 Claims, 5 Drawing Sheets

PROJECTION SYSTEM AND PROJECTION METHOD

CROSS-REFERENCE TO RELATED APPLICATION

This application claims the priority benefit of China application serial no. 202010428793.2, filed on May 20, 2020. The entirety of the above-mentioned patent application is hereby incorporated by reference herein and made a part of this specification.

BACKGROUND OF THE INVENTION

1. Field of the Invention

The invention relates to a projection display technology, and in particular, to a projection system for display and a projection method thereof.

2. Description of Related Art

In general, a plurality of projectors may project a plurality of projection pictures onto a same projection surface to form a blended picture. In this process, a user needs to manually adjust the projector to align and blend the plurality of projection pictures. However, because the projection surface may be a non-planar region, or the overall brightness of the projection environment may be low, the user often spends more time in the adjustment process because grid colors of the plurality of projection pictures projected by the plurality of projectors are the same, further causing an adjustment error. In view of this, an exemplary embodiment of the solution will be proposed below.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection system and a projection method, which can perform blending and correction by simultaneously projecting a plurality of grid pictures by a plurality of projectors, so that the plurality of projectors can project an appropriate blended projection picture onto a projection surface after corrected.

Other objectives and advantages of the invention may further be learned from technical features disclosed in the invention.

In order to achieve one or some or all of the above purposes or other purposes, an embodiment of the invention provides a projection system. The projection system includes a first projector and a second projector. The first projector is configured to project a first grid picture onto a projection surface. The second projector is configured to project a second grid picture onto the projection surface, the second grid picture and the first grid picture being blended into a blended projection picture. The first grid picture includes a first overlap region, a grid line of the first overlap region being displayed in a first color. The second grid picture includes a second fusion region, a grid line of the second fusion region being displayed in a second color. The first color and the second color are complementary colors, so that when the blended projection picture is formed, a grid line of an overlap region of the first grid picture and the second grid picture is displayed in a recognition color.

In order to achieve one or a part or all of the foregoing objectives or other objectives, another embodiment of the invention provides a projection system, including a first projector, a second projector, a third projector, and a fourth projector. The first projector is configured to project a first grid picture onto a projection surface. The second projector is configured to project a second grid picture onto the projection surface. The third projector is configured to project a third grid picture onto the projection surface. The fourth projector is configured to project a fourth grid picture onto the projection surface, so that the first to fourth grid pictures are blended into a blended projection picture. The first grid picture includes a first right fusion region, a first lower fusion region, and a first intersection region. The first intersection region is located at an overlap of the first right fusion region and the first lower fusion region. The second grid picture includes a second left fusion region, a second lower fusion region, and a second intersection region. The second intersection region is located at an overlap of the second left fusion region and the second lower fusion region. The third grid picture includes a third upper fusion region, a third right fusion region, and a third intersection region. The third intersection region is located at an overlap of the third upper fusion region and the third right fusion region. The fourth grid picture includes a fourth upper fusion region, a fourth left fusion region, and a fourth intersection region. The fourth intersection region is located at an overlap of the fourth upper fusion region and the fourth left fusion region. Grid lines of the first right fusion region and the first lower fusion region are displayed in a first color. A grid line of the second left fusion region is displayed in a second color. A grid line of the second lower fusion region is displayed in the first color. A grid line of the third upper fusion region is displayed in the second color. A grid line of the third right fusion region is displayed in the first color. Grid lines of the fourth upper fusion region and the fourth left fusion region are displayed in the second color. Grid lines of the first intersection region and the fourth intersection region are displayed in a third color. Grid lines of the second intersection region and the third intersection region are displayed in a fourth color. The first color and the second color are complementary colors. The third color and the fourth color are complementary colors, so that when the first to fourth grid pictures are blended to form a blended projection picture, grid lines of overlap regions of the first to fourth grid pictures are displayed in a recognition color.

In order to achieve one or some or all of the above objectives or other objectives, an embodiment of the invention provides a projection method, which may be applied to a projection system. The projection system includes a first projector and a second projector. The projection method includes the following steps: projecting, by the first projector, a first grid picture onto a projection surface, the first grid picture including a first overlap region, a grid line of the first overlap region being displayed in a first color; projecting, by the second projector, a second grid picture onto the projection surface, the second grid picture including a second overlap region, a grid line of the second overlap region being displayed in a second color, the first color and the second color being complementary colors; and moving the first grid picture and the second grid picture, to form a blended projection picture through blending. The first overlap region and the second overlap region at least partially overlap, and a grid line of an overlap region of the first grid picture and the second grid picture is displayed in a recognition color.

In order to achieve one or some or all of the above objectives or other objectives, still another embodiment of the invention provides a projection method applicable to a projection system. The projection system includes a first projector, a second projector, a third projector, and a fourth projector. The projection method includes the following steps. The first projector projects a first grid picture onto a projection surface, where the first grid picture includes a first right overlap region, a first lower overlap region, and a first intersection region. The first intersection region is located at an overlap of the first right overlap region and the first lower overlap region. The second projector projects a second grid picture onto the projection surface, where the second grid picture includes a second left overlap region, a second lower overlap region, and a second intersection region. The second intersection region is located at an overlap of the second left overlap region and the second lower overlap region. The third projector projects a third grid picture onto the projection surface, where the third grid picture includes a third upper overlap region, a third right overlap region, and a third intersection region. The third intersection region is located at an overlap of the third upper overlap region and the third right overlap region. The fourth projector projects a fourth grid picture onto the projection surface, where the fourth grid picture includes a fourth upper overlap region, a fourth left overlap region, and a fourth intersection region. The fourth intersection region is located at an overlap of the fourth upper overlap region and the fourth left overlap region. The first grid picture, the second grid picture, the third grid picture, and the fourth grid picture are moved to form a blended projection picture through blending. Grid lines of the first right overlap region and the first lower overlap region are displayed in a first color. A grid line of the second left overlap region is displayed in a second color. A grid line of the second lower overlap region is displayed in the first color. A grid line of the third upper overlap region is displayed in the second color. A grid line of the third right overlap region is displayed in the first color. Grid lines of the fourth upper overlap region and the fourth left overlap region are displayed in the second color. Grid lines of the first intersection region and the fourth intersection region are displayed in a third color. Grid lines of the second intersection region and the third intersection region are displayed in a fourth color. The first color and the second color are complementary colors. The third color and the fourth color are complementary colors, so that when the blended projection picture is formed, grid lines of overlap regions of the first to fourth grid pictures are displayed in a recognition color.

Based on the foregoing, the embodiments of the invention have at least one of the following advantages or effects. In the projection system and the projection method of the invention, a plurality of grid pictures may be projected by a plurality of projectors to perform blending and correction of the projection pictures. Each grid picture may include an overlap region configured to overlap overlap regions of other grid pictures. When there is no overlap, the grid lines of the overlap regions of the plurality of grid pictures are respectively displayed in different colors, and for example, when two different overlap regions overlap, the grid lines thereof are displayed in the recognition colors. Therefore, since the recognition color may be used to remind the user of the positions of at least two overlap regions, according to the invention, the user may be reminded whether the grid pictures are accurately blended, thereby quickly and effectively projecting a well-blended picture onto the projection surface.

To make the features and advantages of the invention clear and easy to understand, the following gives a detailed description of embodiments with reference to accompanying drawings.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical contents, features and effects of the invention will be clearly presented in the following detailed description of an exemplary embodiment with reference to the drawings. Direction terms mentioned in the following embodiments, for example: up, down, left, right, front, back, or the like are merely the directions with reference to the drawings. Therefore, the direction terms used are used to describe but not to limit the invention.

Figure 1:
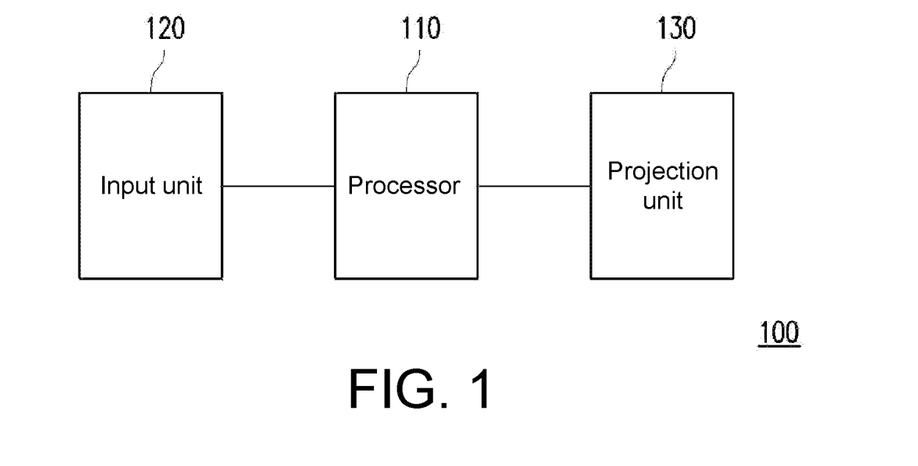
FIG. 1 is a schematic block diagram of a projector according to an embodiment of the invention.

FIG. 1 is a schematic block diagram of a projector according to an embodiment of the invention. Referring to FIG. 1, a projector 100 includes a processor 110, an input unit 120, and a projection unit 130. The processor 110 is coupled to the input unit 120 and the projection unit 130. In the present embodiment, the input unit 120 is configured to receive an operation signal input from the outside and output an operation instruction corresponding to the operation signal to the processor 110. The input unit 120 may be, for example, a control panel of the projector 100 or a remote control device of the projector 100, and the invention is not limited. For example, when a user intends to adjust a projection picture, on screen display (OSD) may be enabled by operating the input unit 120, and the operation instruction may be transmitted by operating the input unit 120 to perform projection setting.

In the present embodiment, the projector 100 may cooperate with another projector for projection. The projection unit 130 of the projector 100 may project a grid picture to a projection surface for the user to adjust the grid picture through the input unit 120. The grid picture includes an overlap region and a non-overlap region. For example, when two projectors jointly perform projecting, the overlap region and the overlap region of the grid picture of another projector overlap, so that two projection pictures of the two projectors may be properly blended together. Therefore, the processor 110 of the projector 100 may control the projection unit 130 according to the operation instruction to set numbers, positions, and sizes of the overlap regions in the grid picture of the projector 100.

In the present embodiment, the projection unit 130 may include related circuit elements such as a light source module, a light engine module, a projection lens set, an image transmission interface, and the like. For example, the light source module may include a light emitting unit such as a discharge bulb, a light emitting diode, or a laser light source. The light engine module may include a reflective spatial light modulator or a transmissive spatial light modulator. The reflective spatial light modulator may include, for example, reflective liquid crystal on silicon (LCoS) or a digital micro-mirror device (DMD). The transmissive spatial light modulator may include, for example, a transparent liquid crystal panel. The projection lens set may include a plurality of lenses, and the plurality of lenses may be disposed on an optical path of a beam. The processor 110 is, for example, a central processing unit (CPU), or other programmable general-purpose or special-purpose microprocessors, a digital signal processor (DSP), a programmable controller, an application-specific integrated circuit (ASIC), a programmable logic device (PLD), or other similar apparatuses or a combination of the apparatuses.

Figure 2:
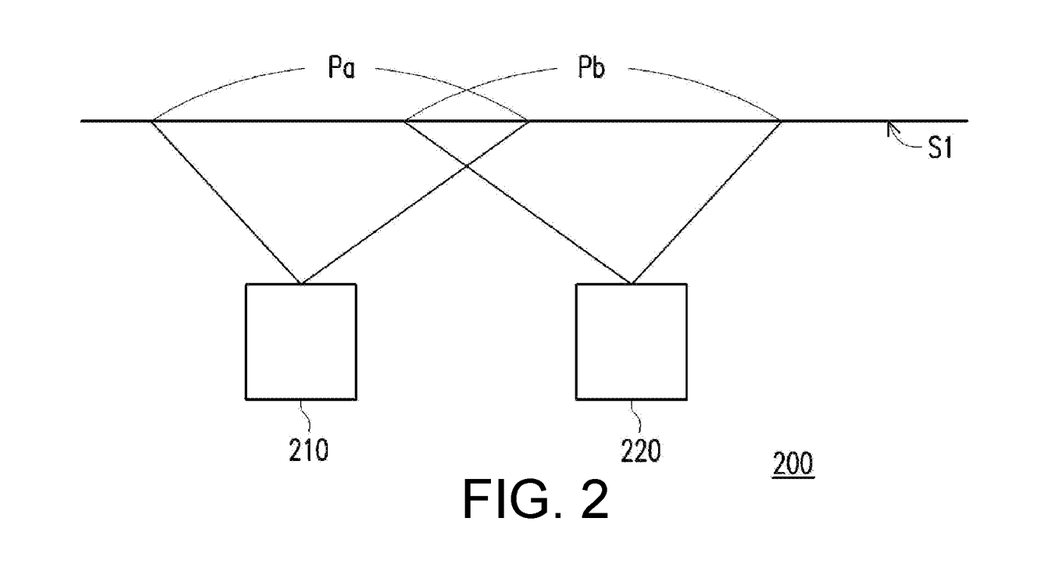
FIG. 2 is a schematic projection diagram of a projection system according to an embodiment of the invention.
Figure 3A:
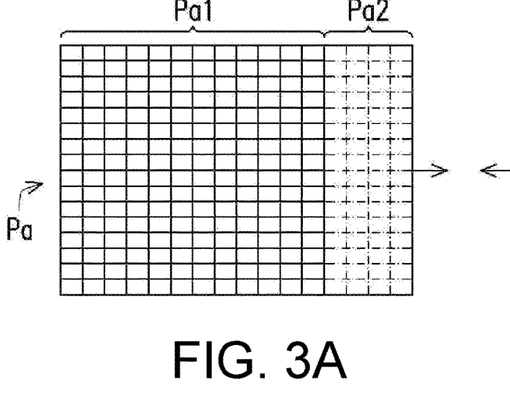
FIG. 3A to FIG. 3D are each a schematic diagram of a projection picture according to an embodiment of the invention.
Figure 3B:
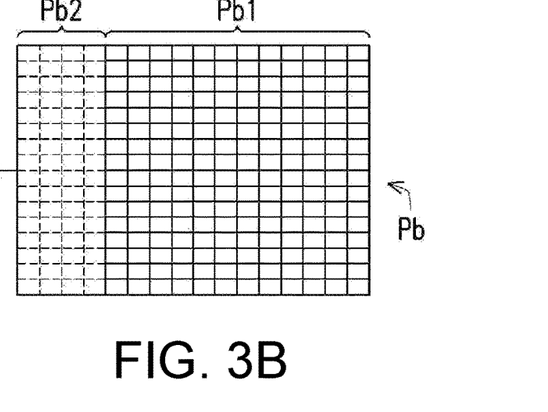
Figure 3C:
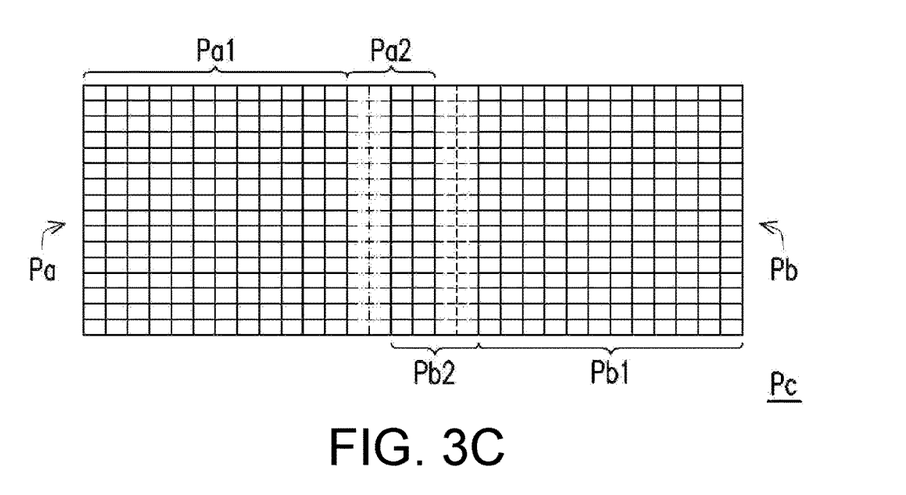
Figure 3D:
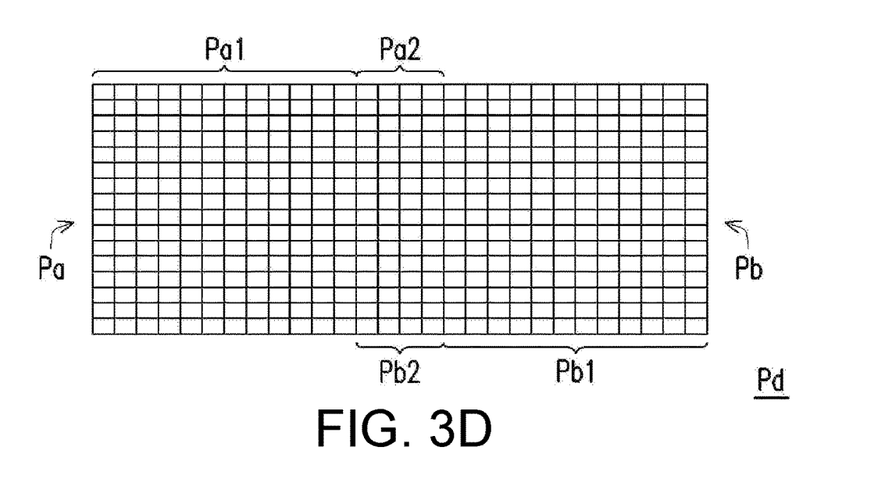

FIG. 2 is a schematic projection diagram of a projection system according to an embodiment of the invention. FIG. 3A to FIG. 3D are each a schematic diagram of a projection picture according to an embodiment of the invention. Referring to FIG. 2 to FIG. 3D, a projection system 200 includes a first projector 210 a second projector 220. FIG. 2 is a schematic top view of the first projector 210 and the second projector 220 projecting toward a projection surface S1. FIG. 3A and FIG. 3D are front views of the projection surface S1. In the present embodiment, a user may enable on screen display by operating an input unit of the first projector 210 or the second projector 220 to blend and correct the projection picture, for example, set a position and a range of an overlap region of the first projector 210 or the second projector 220.

Specifically, as shown in FIG. 3A, according to the setting, the first projector 210 projects a first grid picture Pa onto the projection surface S1, and the second projector 220 projects a second grid picture Pb onto the projection surface S1. The first grid picture Pa includes a first non-overlap region Pa1 and a first overlap region Pa2. The second grid picture Pb includes a second non-overlap region Pb1 and a second overlap region Pb2. The first grid picture Pa and the second grid picture Pb are movable under the control of a user, so that the first overlap region Pa2 and the second overlap region Pb2 at least partially overlap, and a blended projection picture Pc is further formed. Further, the user may use the foregoing input unit 120 to control the movement of the first grid picture Pa or the second grid picture Pb to form the blended projection picture Pc.

In the present embodiment, the first overlap region Pa2 is located on a right side of the first grid picture Pa, and the second overlap region Pb2 is located on a left side of the second grid picture Pb, but the invention is not limited thereto. In one embodiment, the first overlap region Pa2 may be located on a lower side of the first grid picture Pa, and the second overlap region Pb2 may be located on an upper side of the second grid picture Pb. In addition, in the present embodiment, an area of the first overlap region Pa2 is not greater than half of the first grid picture Pa, and an area of the second overlap region Pb2 is not greater than half of the second grid picture Pb. The ranges and positions of the first overlap region Pa2 and the second overlap region Pb2 may be set according to the use requirements.

In this embodiment, grid lines of the first non-overlap region Pa1 and the second non-overlap region Pb1 are displayed in a base color, and the base color may be white, for example. In a further embodiment, RGB values of the base color are (255, 255, 255). As shown in FIG. 3A and FIG. 3B, the base color is represented by solid lines, but the drawing of grid lines is only used to illustrate colors thereof and is not intended to limit the invention.

In this embodiment, grid lines of the first overlap region Pa2 are displayed in a first color, and the first color may be green, for example. In a further embodiment, RGB values of the first color are (0, 255, 0). As shown in FIG. 3A, a dotted line represents the first color. Grid lines of the second overlap region Pb2 are displayed in a second color, and the second color may be magenta, for example. In a further embodiment, RGB values of the second color are (255, 0, 255). As shown in FIG. 3B, a dashed line represents the second color. In the foregoing embodiment, the first color and the second color are complementary colors, so that when the projection picture Pc (as shown in FIG. 3C) or Pd (as shown in FIG. 3D), grid lines of an overlap region (that is, the overlap region of the first overlap region Pa2 and the second overlap region Pb2) of the first grid picture Pa and the second grid picture Pb are displayed in a recognition color (blank in the grid line), and the recognition color is white, for example, with RGB values of (255, 255, 255). In the present embodiment, the recognition color is the same as the base color, but the invention is not limited thereto. In other embodiments, the recognition color may be different from the base color.

In the foregoing embodiment, when adjusting the projection pictures of the first projector 210 and the second projector 220, the user may determine relative positions of the first grid picture Pa and the second grid picture Pb by using the color of the grid lines, and further determine whether the first grid picture Pa and the second grid picture Pb are properly blended. For example, as shown in FIG. 3C, when the projection picture Pc includes the grid line (representing the first color with the dotted line) in the first color or the grid line (representing the second color with the dashed line) in the second color, the user may determine that the first grid picture Pa and the second grid picture Pb have not been properly blended. As shown in FIG. 3D, when the projection picture Pd does not include the grid line in the first color or the second color, for example, when the grid line in the projection picture Pd is displayed in the base color and/or recognition color (in FIG. 3D, the base color is the same as the recognition color, both represented by solid lines), the user may determine that the first grid picture Pa and the second grid picture Pb have been properly blended.

It should be noted that the foregoing first color and second color are not limited thereto. In an embodiment, the first color and the second color may also be designed or presented by selecting two corresponding complementary colors by the user.

In the present embodiment, a grid width of the first grid picture Pa is the same as a grid width of the second grid picture Pb, and the minimum grid width of the first grid a grid width Pa and/or the minimum grid width of the second grid a grid width Pb may be equal to one pixel size. In a further embodiment, before blending, grids of the first grid picture Pa and the second grid picture Pb may be each filled with black. For example, the grids of the first non-overlap region Pa1 of the first grid picture Pa and/or the second non-overlap region Pb1 of the second grid picture Pb may be filled with black, and the grids of the first overlap region Pa2 and/or the second overlap region Pb2 may also be filled with black. However, the invention is not limited thereto. In the present embodiment, when blending is started, that is, when there is an overlap region between the first overlap region Pa2 of the first grid picture Pa and the second overlap region Pb2 of the second grid picture Pb, the grid may be filled with gray in the overlap region.

Figure 4:
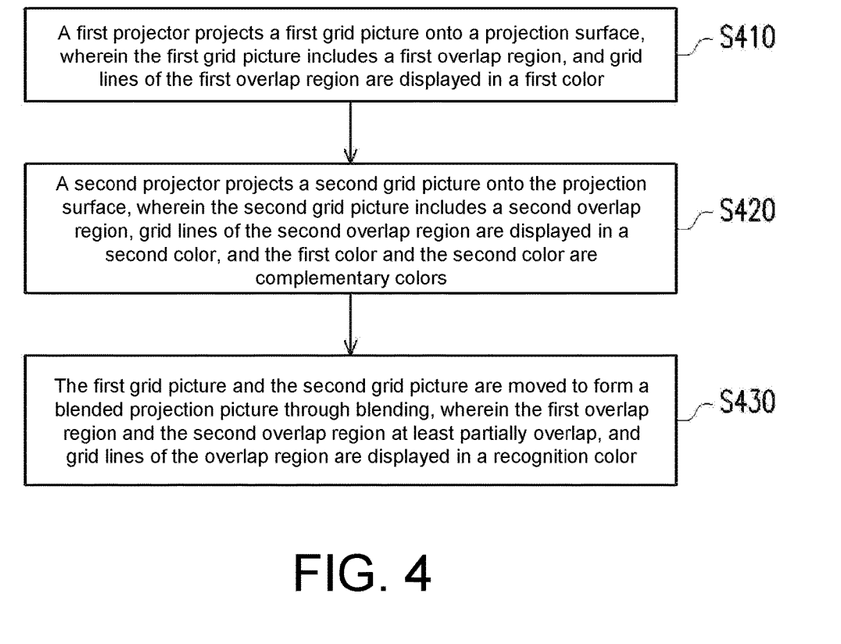
FIG. 4 is a flowchart of a projection method according to an embodiment of the invention.

FIG. 4 is a flowchart of a projection method according to an embodiment of the invention. Referring to FIG. 2, FIG. 3A to FIG. 3D, and FIG. 4, the projection method of the embodiment of FIG. 4 may be applied to the projection system 200 of FIG. 2 and the projection scenarios of FIG. 3A to FIG. 3D. The first projector 210 and the second projector 220 of the projection system 200 may perform the following steps S410 to S430.

In step S410, the first projector 210 projects a first grid picture Pa onto a projection surface S1, the first grid picture Pa including a first overlap region Pa2, a grid line of the first overlap region Pa2 being displayed in a first color. In step S420, the second projector 220 projects a second grid picture Pb onto the projection surface S1, the second grid picture Pb including a second overlap region Pb2, a grid line of the second overlap region Pb2 being displayed in a second color, the first color and the second color being complementary colors. In step S430, a user operates the first projector 210 and the second projector 220, so that the first grid picture Pa and the second grid picture Pb may be moved to form a blended projection picture Pc or Pd through blending. In the present embodiment, the first overlap region Pa2 and the second overlap region Pb2 at least partially overlap, and a grid line of an overlap region is displayed in a recognition color.

According to the projection method of the present embodiment, the user may be allowed to conveniently and quickly adjust respective projection positions of the first projector 210 and the second projector 220 of the projection system 200 on the projection surface S1, to project the blended projection picture Pd with a good blending effect.

For the relevant internal units, projection details, and technical means of the projection system 200 of the present embodiment, adequate teaching, advices, and implementation descriptions may be obtained by referring to the foregoing embodiments of FIG. 1 and FIG. 3A to FIG. 3D, and the descriptions thereof are omitted.

Figure 5:
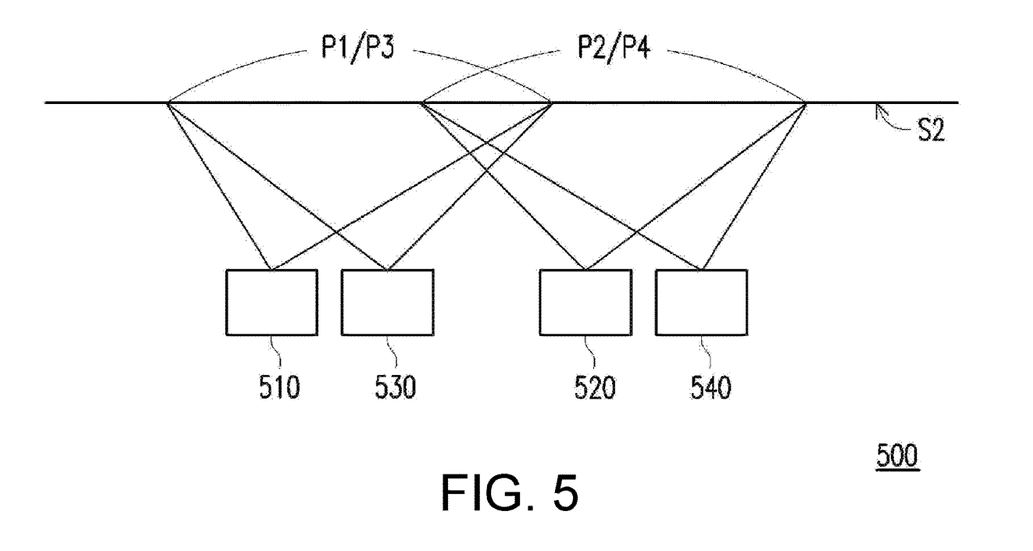
FIG. 5 is a schematic projection diagram of a projection system according to another embodiment of the invention.

FIG. 5 is a schematic projection diagram of a projection system according to another embodiment of the invention. FIG. 6A to FIG. 6E are each a schematic diagram of a projection picture according to another embodiment of the invention. Referring to FIG. 5 and FIG. 6A to FIG. 6E, a projection system 500 includes a first projector 510, a second projector 520, a third projector 530, and a fourth projector 540. FIG. 5 is a schematic top view of the first projector 510, the second projector 520, the third projector 530, and the fourth projector 540 projecting toward a projection surface S2, and FIG. 6A to FIG. 6E are each a front view of a projection surface S2. In the present embodiment, a user may enable on screen display by operating input units of the first projector 510, the second projector 520, the third projector 530, and the fourth projector 540, to blend and correct four projection pictures, for example, set a position and a range of at least one overlap region of each projection picture. It should be noted that the first projector 510, the second projector 520, the third projector 530, and the fourth projector 540 of the present embodiment are similar to the two projectors 210 and 220 of FIG. 2. Therefore, the related technical details may also be deduced with reference to the description of the embodiment of FIG. 2.

Specifically, as shown in FIG. 6A to FIG. 6E, through setting by the user, the first projector 510 projects a first grid picture P1 onto an upper left position of the projection surface S2, the second projector 520 projects a second grid picture P2 onto an upper right position of the projection surface S2, the third projector 530 projects a third grid picture P3 onto a lower left position of the projection surface S2, and the fourth projector 540 projects a fourth grid picture P4 onto a lower right position of the projection surface S2.

Figures 6A, 6B:
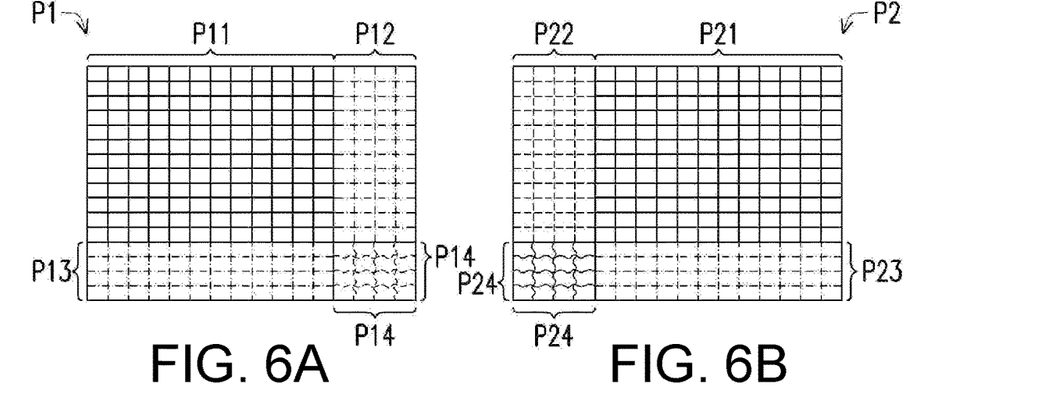
FIG. 6A to FIG. 6E are each a schematic diagram of a projection picture according to another embodiment of the invention.
Figures 6C, 6D:
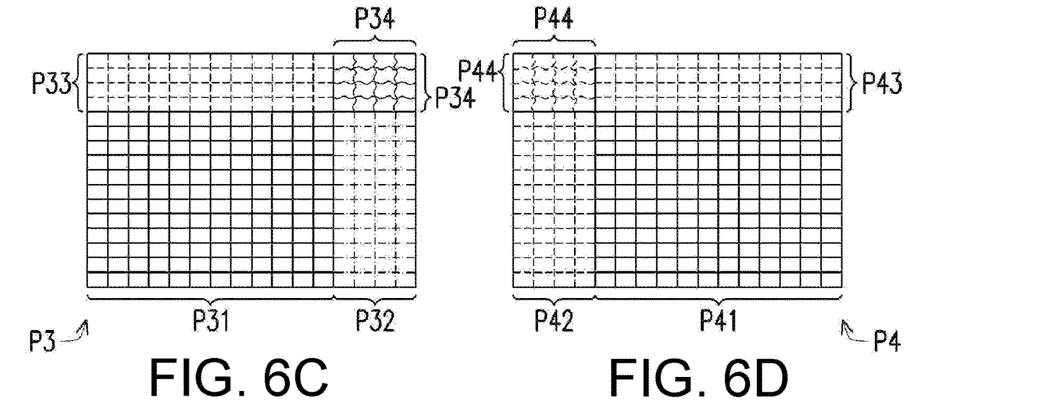

In the present embodiment, the first grid picture P1 includes a first non-overlap region P11, a first right overlap region P12, and a first lower overlap region P13. As shown in FIG. 6A, an intersection region of the first right overlap region P12 and the first lower overlap region P13 is denoted as a first intersection region P14, that is, the first intersection region P14 is located at an overlap of the first right overlap region P12 and the first lower overlap region P13. Similarly, the second grid picture P2 includes a second non-overlap region P21, a second left overlap region P22, and a second lower overlap region P23. As shown in FIG. 6B, an intersection region of the second left overlap region P22 and the second lower overlap region P23 is denoted as a second intersection region P24, that is, the second intersection region P24 is located at an overlap of the second left overlap region P22 and the second lower overlap region P23. Similarly, the third grid picture P3 includes a third non-overlap region P31, a third right overlap region P32, and a third upper overlap region P33. As shown in FIG. 6C, an intersection region of the third right overlap region P32 and the third upper overlap region P33 is denoted as a third intersection region P34, that is, the third intersection region P34 is located at an overlap of the third right overlap region P32 and the third upper overlap region P33. Similarly, the fourth grid picture P4 includes a fourth non-overlap region P41, a fourth left overlap region P42, and a fourth upper overlap region P43. As shown in FIG. 6D, an intersection region of the fourth left overlap region P42 and the fourth upper overlap region P43 is denoted as a fourth intersection region P44, that is, the fourth intersection region P44 is located at an overlap of the fourth left overlap region P42 and the fourth upper overlap region P43.

In the present embodiment, grid lines of the first non-overlap region P11, the second non-overlap region P21, the third non-overlap region P31, and the fourth non-overlap region P41 are displayed in a base color, as shown in FIG. 6A to FIG. 6D, the base color being represented by solid lines.

In the present embodiment, grid lines of the first right overlap region P12 and the first lower overlap region P13 are displayed in a first color. A grid line of the second left overlap region P22 is displayed in a second color. A grid line of the second lower overlap region P23 is displayed in the first color. A grid line of the third upper overlap region P33 is displayed in the second color. A grid line of the third right overlap region P32 is displayed in the first color. Grid lines of the fourth upper overlap region P43 and the fourth left overlap region P42 are displayed in the second color. Further, grid lines of the first intersection region P14 and the fourth intersection region P44 are displayed in a third color, and grid lines of the second intersection region P24 and the third intersection region P34 are displayed in a fourth color. In the present embodiment, the first color is green, and the second color is magenta, for example. The third color is red with RGB values of (255, 0, 0), and the third color is represented by wavy solid lines. The fourth color is cyan with RGB values of (0, 255, 255), and the fourth color is represented by wavy broken lines.

Figure 6E:
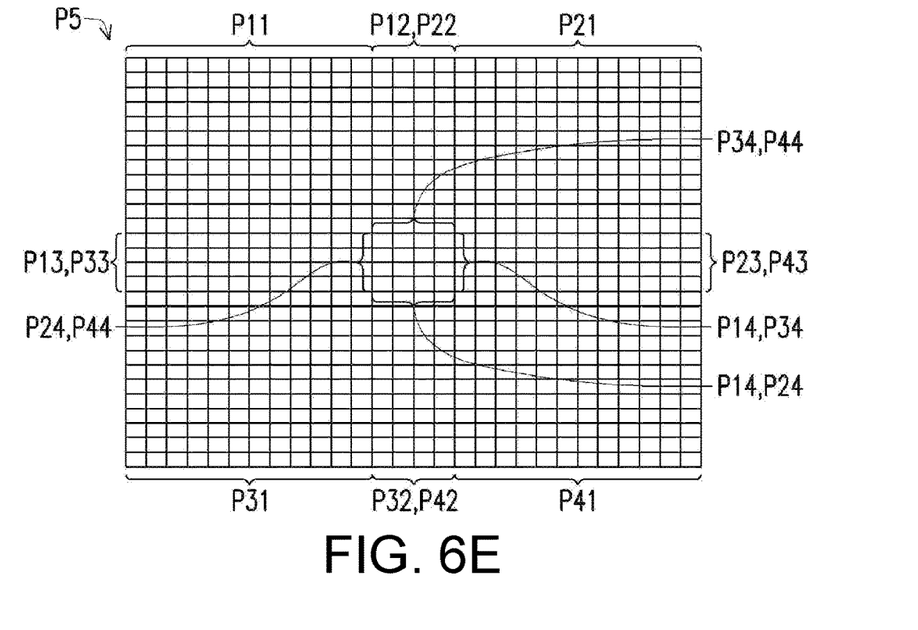

In the present embodiment, the first color and second color are complementary colors, and the third color and the fourth color are complementary colors, so that when the first to fourth grid pictures P1 to P4 are blended to form a blended projection picture P5 (as shown in FIG. 6E), grid lines of overlap regions of the first to fourth grid pictures P1 to P4 are displayed in a recognition color, where the recognition color is white, for example. In detail, the overlap regions of the first to fourth grid pictures P1 to P4 include overlap regions of the overlap regions P12 and P22, overlap regions of the overlap regions P13 and P33, overlap regions of the overlap regions P32 and P42, and overlap regions of the overlap regions P23 and P43, and further include overlap regions of the intersection regions P14, P24, P34, and P44.

It should be noted that the foregoing first to fourth colors are not limited thereto. In an embodiment, the first to fourth colors may also be designed or presented by selecting four corresponding complementary colors by the user.

In a further embodiment, before blending, grids of the non-overlap regions of the grid pictures may be filled with black, and grids of the overlap regions may be filled with gray or black.

In the present embodiment, similar to the embodiments of FIG. 3A to FIG. 3D, when adjusting the projection pictures of each projector, the user may determine relative positions of the grid pictures P1 to P4 by using the colors of the grid lines, and further determine whether the grid pictures P1 to P4 are properly blended.

Figure 7:
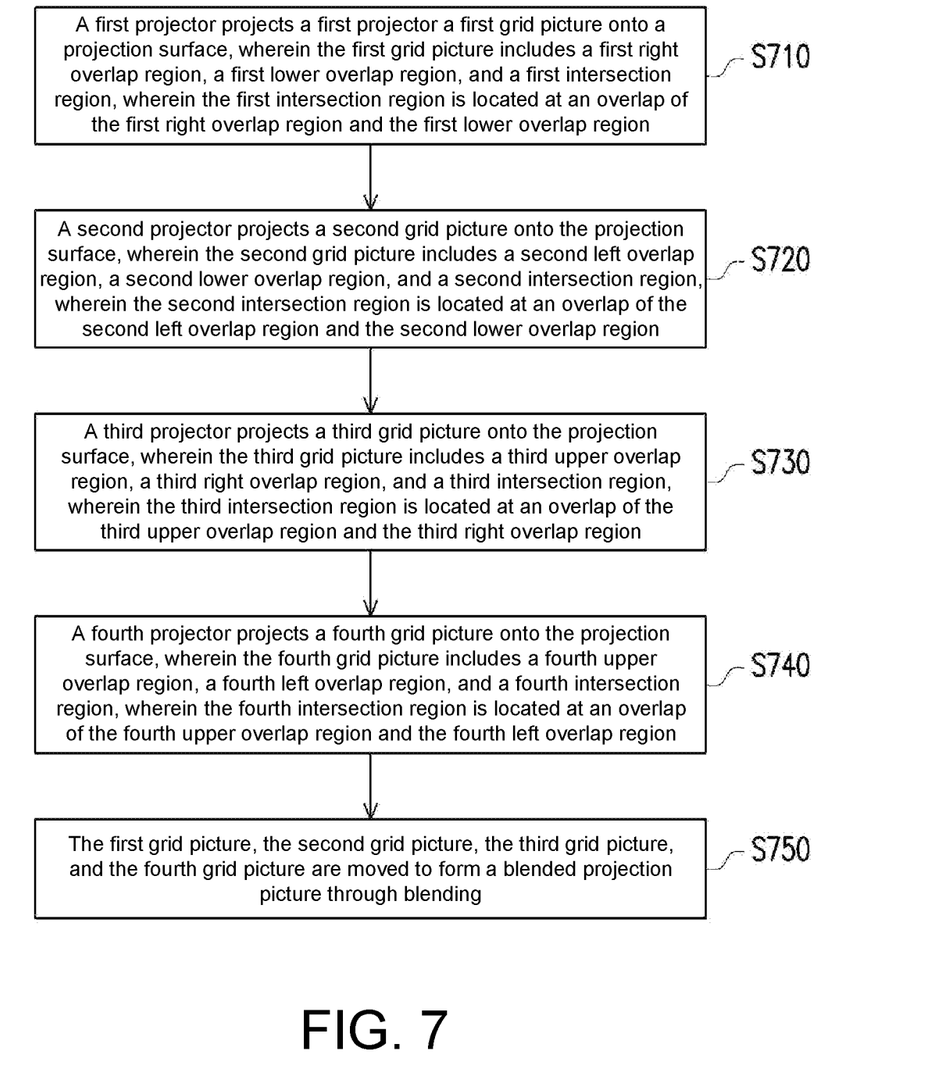
FIG. 7 is a flowchart of a projection method according to another embodiment of the invention.

FIG. 7 is a flowchart of a projection method according to another embodiment of the invention. Referring to FIG. 5 to FIG. 7, the projection method of the present embodiment may be applied to the projection system 500 of FIG. 5 and the projection scenarios of FIG. 6A to FIG. 6E. The first to fourth projectors 510-540 of the projection system 500 may implement the following steps S710 to S750.

In step S710, the first projector 510 projects a first grid picture P1 onto a projection surface S2, the first grid picture P1 including a first right overlap region P12, a first lower overlap region P13, and a first intersection region P14, the first intersection region P14 being located at an overlap of the first right overlap region P12 and the first lower overlap region P13. In step S720, the second projector 520 projects a second grid picture P2 onto the projection surface S2, the second grid picture P2 including a second left overlap region P22, a second lower overlap region P23, and a second intersection region P24, the second intersection region P24 being located at an overlap of the second left overlap region P22 and the second lower overlap region P23. In step S730, the third projector 530 projects a third grid picture P3 onto the projection surface S2, the third grid picture P3 including a third upper overlap region P33, a third right overlap region P32, and a third intersection region P34, the third intersection region P34 being located at an overlap of the third upper overlap region P33 and the third right overlap region P32. In step S740, the fourth projector 540 projects a fourth grid picture P4 onto the projection surface S2, the fourth grid picture P4 including a fourth upper overlap region P43, a fourth left overlap region P42, and a fourth intersection region P44, the fourth intersection region P44 being located at an overlap of the fourth upper overlap region P43 and the fourth left overlap region P42.

In step S750, a user operates the projectors to cause the first grid picture P1, the second grid picture P2, the third grid picture P3, and the fourth grid picture P4 to move, to form a blended projection picture P5 through blending.

According to the projection method of the present embodiment, the user may be allowed to conveniently and quickly adjust respective projection positions of the first projector 510, the second projector 520, the third projector 530, and the fourth projector 540 of the projection system 500 on the projection surface S2, to project the blended projection picture with a good blending effect.

For the relevant internal units, projection details, and technical means of the projection system 500 of the present embodiment, adequate teaching, advices, and implementation descriptions may be obtained by referring to the foregoing embodiments of FIG. 5 and FIG. 6A to FIG. 6E, and the descriptions thereof are omitted.

Based on the above, the embodiments of the invention have at least one of the following advantages or effects. In the projection system and the projection method of the invention, a plurality of grid pictures may be projected by a plurality of projectors to perform blending and correction of the projection pictures. Each grid picture may include an overlap region configured to overlap overlap regions of other grid pictures. When there is no overlap, the grid lines of the overlap regions of the plurality of grid pictures are respectively displayed in different colors, and for example, when two different overlap regions overlap, the grid lines thereof are displayed in the recognition colors. Therefore, since the recognition color may be used to remind the user of the positions of at least two overlap regions, according to the invention, the user may be reminded whether the grid pictures are accurately blended, thereby quickly and effectively projecting a well-blended picture on the projection surface.

However, as mentioned above, the abstract and the title of the invention are only used to assist the search of patent documents, not to limit the scope of the invention. In addition, the terms "first" and "second" mentioned in this specification or claims are only used to name an element or to distinguish different embodiments or ranges, and are not used to limit the upper or lower limit of the number of elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising a first projector and a second projector, wherein
the first projector is configured to project a first grid picture onto a projection surface; and
the second projector is configured to project a second grid picture onto the projection surface, and the second grid picture and the first grid picture are blended into a blended projection picture, wherein
an outer contour of the first grid picture is rectangular, entire area surrounded by the outer contour of the first grid picture is filled with grids of the first grid picture, an outer contour of the second grid picture is rectangular, and entire area surrounded by the outer contour of the second grid picture is filled with grids of the second grid picture,
the first grid picture comprises only one first overlap region located on a first side of the first grid picture, and grid lines of the first overlap region are displayed in a first color,
the second grid picture comprises only one second overlap region located on a second side of the second grid picture, and grid lines of the second overlap region are displayed in a second color,
the first side and the second side are opposite sides, wherein
the first color and the second color are complementary colors, so that every grid lines of an overlap region of the first grid picture and the second grid picture are displayed in a recognition color when the blended projection picture is formed,
wherein the grid lines of the first overlap region and the grid lines of the second overlap region are overlapped with each other in the overlap region of the first grid picture and the second grid picture when the blended projection picture is formed, and wherein numbers of grids of the first overlap region and numbers of grids of the second overlap region are the same in the overlap region of the first grid picture and the second grid picture.

2. The projection system according to claim 1, wherein the first grid picture comprises a first non-overlap region, the second grid picture comprises a second non-overlap region, and grid lines of the first non-overlap region and the second non-overlap region are displayed in a base color.

3. The projection system according to claim 2, wherein the recognition color is the same as the base color and is white.

4. The projection system according to claim 1, wherein the first color is green, and the second color is magenta.

5. The projection system according to claim 1, wherein the first side is a right side of the first grid picture, and the second side is a left side of the second grid picture, or the first side is a lower side of the first grid picture, and the second side is a upper side of the second grid picture.

6. The projection system according to claim 1, wherein an area of the first overlap region is not greater than half of the first grid picture, and an area of the second overlap region is not greater than half of the second grid picture.

7. The projection system according to claim 1, wherein a minimum grid width of the first grid picture is equal to one pixel size, and a minimum grid width of the second grid picture is equal to one pixel size.

8. The projection system according to claim 1, wherein grids of the first grid picture are filled with black, and grids of the second grid picture are filled with black.

9. The projection system according to claim 1, wherein grids of the overlap region of the first grid picture and the second grid picture are filled with gray.

10. The projection system according to claim 1, wherein at least one of the first projector and the second projector comprises:
a processor;
a projection unit, coupled to the processor and configured to project the first grid picture and/or the second grid picture; and
an input unit, coupled to the processor and configured to receive an operation signal and output an operation instruction corresponding to the operation signal to the processor, wherein
the processor controls the projection unit according to the operation instruction to set positions, and sizes of the first overlap region and/or the second overlap region within ranges of the first grid picture and/or the second grid picture.

11. A projection system, comprising a first projector, a second projector, a third projector, and a fourth projector, wherein
the first projector is configured to project a first grid picture onto a projection surface;
the second projector is configured to project a second grid picture onto the projection surface;
the third projector is configured to project a third grid picture onto the projection surface; and
the fourth projector is configured to project a fourth grid picture onto the projection surface, so that the first to fourth grid pictures are blended into a blended projection picture, wherein
an outer contour of the first grid picture is rectangular, entire area surrounded by the outer contour of the first grid picture is filled with grids of the first grid picture, an outer contour of the second grid picture is rectangular, entire area surrounded by the outer contour of the second grid picture is filled with grids of the second grid picture, an outer contour of the third grid picture is rectangular, entire area surrounded by the outer contour of the third grid picture is filled with grids of the third grid picture, an outer contour of the fourth grid picture is rectangular, and entire area surrounded by the outer contour of the fourth grid picture is filled with grids of the fourth grid picture, the first grid picture comprises only one first right overlap region, only one first lower overlap region, and only one first intersection region, wherein the first intersection region is located at an overlap of the first right overlap region and the first lower overlap region, the first right overlap region is located on a first side of the first grid picture, the first lower overlap region is located on a second side of the first grid picture, wherein the second grid picture comprises only one second left overlap region, only one second lower overlap region, and only one second intersection region, wherein the second intersection region is located at an overlap of the second left overlap region and the second lower overlap region, the second left overlap region is located on a third side of the second grid picture, the second lower overlap region is located on a second side of the second grid picture, wherein the third grid picture comprises only one third upper overlap region, only one third right overlap region, and only one third intersection region, wherein the third intersection region is located at an overlap of the third upper overlap region and the third right overlap region, the third upper overlap region is located on a fourth side of the third grid picture, the third right overlap region is located on a first side of the third grid picture, wherein the fourth grid picture comprises only one fourth upper overlap region, only one fourth left overlap region, and only one fourth intersection region, wherein the fourth intersection region is located at an overlap of the fourth upper overlap region and the fourth left overlap region, the fourth upper overlap region is located on a fourth side of the fourth grid picture, the fourth left overlap region is located on a third side of the fourth grid picture, the first side and the third side are opposite sides, the second side and the fourth side are opposite sides, wherein grid lines of the first right overlap region and the first lower overlap region are displayed in a first color, grid lines of the second left overlap region are displayed in a second color, grid lines of the second lower overlap region are displayed in the first color, grid lines of the third upper overlap region are displayed in the second color, grid lines of the third right overlap region are displayed in the first color, and grid lines of the fourth upper overlap region and the fourth left overlap region are displayed in the second color, wherein grid lines of the first intersection region and the fourth intersection region are displayed in a third color, and grid lines of the second intersection region and the third intersection region are displayed in a fourth color, wherein the first color and the second color are complementary colors, and the third color and the fourth color are complementary colors, so that every grid lines of overlap regions of the first to fourth grid pictures are displayed in a recognition color when the blended projection picture is formed, wherein the grid lines of the first right overlap region, the second left overlap region are overlapped with each other in the overlap region of the first grid picture and the second grid picture, the grid lines of the first lower overlap region, the third upper overlap region are overlapped with each other in the overlap region of the first grid picture and the third grid picture, the grid lines of the second lower overlap region, the fourth upper overlap region are overlapped with each other in the overlap region of the second grid picture and the fourth grid picture, the grid lines of the third right overlap region, the fourth left overlap region are overlapped with each other in the overlap region of the third grid picture and the fourth grid picture, and wherein numbers of grids of the first right overlap region and numbers of grids of the second left overlap region are the same with each other in the overlap region of the first grid picture and the second grid picture, numbers of grids of the first lower overlap region and numbers of grids of the third upper overlap region are the same with each other in the overlap region of the first grid picture and the third grid picture, numbers of grids of the second lower overlap region and numbers of grids of the fourth upper overlap region are the same with each other in the overlap region of the second grid picture and the fourth grid picture, numbers of grids of the third right overlap region and numbers of grids of the fourth left overlap region are the same with each other in the overlap region of the third grid picture and the fourth grid picture.

12. The projection system according to claim 11, wherein the first grid picture comprises a first non-overlap region, the second grid picture comprises a second non-overlap region, the third grid picture comprises a third non-overlap region, and the fourth grid picture comprises a fourth non-overlap region, wherein grid lines of the first to fourth non-overlap regions are displayed in a base color.

13. The projection system according to claim 12, wherein the recognition color of grid lines is the same as the base color of grid lines and is white.

14. The projection system according to claim 11, wherein the first color is green, the second color is magenta, the third color is red, and the fourth color is cyan.

15. A projection method, adapted for a projection system comprising a first projector and a second projector, wherein the projection method comprises:

projecting, by the first projector, a first grid picture onto a projection surface, wherein the first grid picture comprises only one first overlap region located on a first side of the first grid picture, and grid lines of the first overlap region are displayed in a first color;

projecting, by the second projector, a second grid picture onto the projection surface, wherein the second grid picture comprises only one second overlap region located on a second side of the second grid picture, grid lines of the second overlap region are displayed in a second color, the first side and the second side are opposite sides, and the first color and the second color are complementary colors, wherein an outer contour of the first grid picture is rectangular, entire area surrounded by the outer contour of the first grid picture is filled with grids of the first grid picture, an outer contour of the second grid picture is rectangular, and entire area surrounded by the outer contour of the second grid picture is filled with grids of the second grid picture; and moving the first grid picture and the second grid picture to form a blended projection picture wherein the first overlap region and the second overlap region at least partially overlap, and every grid lines of an overlap region are displayed in a recognition color, when the blended projection picture is formed, wherein the grid lines of the first overlap region and the grid lines of the second overlap region are overlapped with each other in the overlap region of the first grid picture and the second grid picture, and wherein numbers of grids of the first overlap region and numbers of grids of the second overlap region are the same in the overlap region of the first grid picture and the second grid picture.

16. The projection method according to claim 15, wherein the first grid picture comprises a first non-overlap region, and the second grid picture comprises a second non-overlap region, wherein grid lines of the first non-overlap region and the second non-overlap region are displayed in a base color.

17. The projection method according to claim 16, wherein the recognition color of grid lines is the same as the base color of grid lines and is white.

18. The projection method according to claim 15, wherein the first color is green, and the second color is magenta.

19. The projection method according to claim 15, wherein the first side is a right side of the first grid picture, and the second side is a left side of the second grid picture, or the first side is a lower side of the first grid picture, and the second side is a upper side of the second grid picture.

20. The projection method according to claim 15, wherein at least one of the first projector and the second projector comprises:

a processor;

a projection unit, coupled to the processor; and an input unit, coupled to the processor, wherein the step of projecting, by the first projector, the first grid picture and/or the step of projecting, by the second projector, the second grid picture comprises:

projecting, by the projection unit, the first grid picture and/or the second grid picture;

receiving, by the input unit, an operation signal, and outputting, by the input unit, an operation instruction corresponding to the operation signal to the processor; and controlling, by the processor, the projection unit according to the operation instruction to set positions, and sizes of the first overlap region and/or the second overlap region within ranges of the first grid picture and/or the second grid picture.

21. A projection method, adapted for a projection system comprising a first projector, a second projector, a third projector, and a fourth projector, wherein the projection method comprises:

projecting, by the first projector, a first grid picture onto a projection surface, wherein the first grid picture comprises only one first right overlap region, only one first lower overlap region, and only one first intersection region, wherein the first intersection region is located at an overlap of the first right overlap region and the first lower overlap region, the first right overlap region is located on a first side of the first grid picture, the first lower overlap region is located on a second side of the first grid picture;

projecting, by the second projector, a second grid picture onto the projection surface, wherein the second grid picture comprises only one second left overlap region, only one second lower overlap region, and only one second intersection region, wherein the second intersection region is located at an overlap of the second left overlap region and the second lower overlap region, the second left overlap region is located on a third side of the second grid picture, the second lower overlap region is located on a second side of the second grid picture;

projecting, by the third projector, a third grid picture onto the projection surface, wherein the third grid picture comprises only one third upper overlap region, only one third right overlap region, and only one third intersection region, wherein the third intersection region is located at an overlap of the third upper overlap region and the third right overlap region, the third upper overlap region is located on a fourth side of the third grid picture, the third right overlap region is located on a first side of the third grid picture;

projecting, by the fourth projector, a fourth grid picture onto the projection surface, wherein the fourth grid picture comprises only one fourth upper overlap region, only one fourth left overlap region, and only one fourth intersection region, wherein the fourth intersection region is located at an overlap of the fourth upper overlap region and the fourth left overlap region, the fourth upper overlap region is located on a fourth side of the fourth grid picture, the fourth left overlap region is located on a third side of the fourth grid picture, the first side and the third side are opposite sides, the second side and the fourth side are opposite sides;

wherein an outer contour of the first grid picture is rectangular, entire area surrounded by the outer contour of the first grid picture is filled with grids of the first grid picture, an outer contour of the second grid picture is rectangular, entire area surrounded by the outer contour of the second grid picture is filled with grids of the second grid picture, an outer contour of the third grid picture is rectangular, entire area surrounded by the outer contour of the third grid picture is filled with grids of the third grid picture, an outer contour of the fourth grid picture is rectangular, and entire area surrounded by the outer contour of the fourth grid picture is filled with grids of the fourth grid picture; and moving the first grid picture, the second grid picture, the third grid picture, and the fourth grid picture to form a blended projection picture, wherein grid lines of the first right overlap region and the first lower overlap region are displayed in a first color, grid lines of the second left overlap region are displayed in a second color, grid lines of the second lower overlap region are displayed in the first color, grid lines of the third upper overlap region are displayed in the second color, grid lines of the third right overlap region are displayed in the first color, grid lines of the fourth upper overlap region and the fourth left overlap region are displayed in the second color, grid lines of the first intersection region and the fourth intersection region are displayed in a third color, and grid lines of the second intersection region and the third intersection region are displayed in a fourth color, wherein the first color and the second color are complementary colors, and the third color and the fourth color are complementary colors, so that when the blended projection picture is formed, every grid lines of overlap regions of the first to fourth grid pictures are displayed in a recognition color when the blended projection picture is formed, wherein the grid lines of the first right overlap region, the second left overlap region are overlapped with each other in the overlap region of the first grid picture and the second grid picture, the grid lines of the first lower overlap region, the third upper overlap region are overlapped with each other in the overlap region of the first grid picture and the third grid picture, the grid lines of the second lower overlap region, the fourth upper overlap region are overlapped with each other in the overlap region of the second grid picture and the fourth grid picture, the grid lines of the third right overlap region, the fourth left overlap region are overlapped with each other in the overlap region of the third grid picture and the fourth grid picture, and wherein numbers of grids of the first right overlap region and numbers of grids of the second left overlap region are the same with each other in the overlap region of the first grid picture and the second grid picture, numbers of grids of the first lower overlap region and numbers of grids of the third upper overlap region are the same with each other in the overlap region of the first grid picture and the third grid picture, numbers of grids of the second lower overlap region and numbers of grids of the fourth upper overlap region are the same with each other in the overlap region of the second grid picture and the fourth grid picture, numbers of grids of the third right overlap region and numbers of grids of the fourth left overlap region are the same with each other in the overlap region of the third grid picture and the fourth grid picture.

* * * * *